United States Patent
Kraft et al.

(10) Patent No.: US 6,442,929 B1
(45) Date of Patent: Sep. 3, 2002

(54) IGNITER ASSEMBLY HAVING SPRING BIASING OF A SEMI-HEMISPHERICAL MOUNT

(75) Inventors: Robert J. Kraft; Brian R. Mack, both of Palm City; Mark A. Minnich, Jupiter; Peter R. Winch, Palm City, all of FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 0 days.

(21) Appl. No.: 09/873,732

(22) Filed: Jun. 4, 2001

(51) Int. Cl.[7] .............................................. F02C 7/266
(52) U.S. Cl. .................................... 60/39.827; 313/145
(58) Field of Search ......................... 60/39.827, 39.821, 60/800; 431/264, 266; 313/144, 145, 149, 122

(56) References Cited

U.S. PATENT DOCUMENTS

| | | | | |
|---|---|---|---|---|
| 2,255,203 A | * | 9/1941 | Wiegand | .................. 60/39.827 |
| 2,651,298 A | * | 9/1953 | Brinson et al. | ............. 313/145 |
| 2,671,186 A | * | 3/1954 | Shoobert | .................. 60/39.827 |
| 2,880,792 A | * | 4/1959 | Raskin | ........................ 431/266 |
| 3,007,312 A | * | 11/1961 | Shutts | ..................... 60/39.821 |
| 4,275,559 A | | 6/1981 | Blair | |
| 4,903,476 A | | 2/1990 | Steber et al. | |
| 5,402,637 A | | 4/1995 | Adam | |

* cited by examiner

*Primary Examiner*—Ted Kim

(57) ABSTRACT

An igniter assembly for a combustor of a gas turbine, the combustor being of a type including a case and a liner within said case, the assembly comprising an igniter including an elongate body having a first end, a second end, and a mounting feature intermediate said first and second ends, and the mounting feature includes a semi-hemispherical surface and an electrode extending through the body, and a base having an internal cavity with a first internal land, a second internal land opposite the first internal land, first seal A means in sealing contact with the first internal land, and biasing means, such as a spring, in contact with the second internal land and said mounting feature. The mounting feature is located within the cavity, the semi-hemispherical surface is proximate the first seal means, and the biasing means urges the semi-hemispherical surface into sealing contact with the first seal means to prevent the leakage of air therethrough.

10 Claims, 2 Drawing Sheets

IGNITER ASSEMBLY HAVING SPRING BIASING OF A SEMI-HEMISPHERICAL MOUNT

FIELD OF THE INVENTION

This invention relates to gas turbine engines, and specifically to igniter assemblies used to provide ignition in combustors of land-based gas turbine engines.

BACKGROUND OF THE INVENTION

Land based gas turbines typically have externally mounted igniter assemblies. Due to the high temperature, high stress environment in which such assemblies must operate, such ignition assemblies may experience thermal cracking within the igniter tip causing the tip to withdraw from the combustion liner. Also, movement of the tip within its mounting base can result in poor sealing, thereby permitting combustor air to escape through the mounting base of the igniter assembly. Such conditions are detrimental to the igniter assembly, and may cause the igniter assembly to malfunction, or fail.

What is needed is an igniter assembly that is able to tolerate relative movement between the liner and the case without significantly stressing the electrode, thereby improving the reliability of the igniter.

SUMMARY OF THE INVENTION

It is an object of this invention to provide an igniter for a gas turbine combustor, which overcomes the drawbacks of the prior art.

It is an object of this invention to provide an igniter for a gas turbine combustor, which utilizes improved sealing mechanism from "O-rings" in multiple locations.

It is an object of this invention to provide an igniter for a gas turbine combustor, which has improved durability & function through the use of a hemisphere and spring system.

It is an object of this invention to provide an igniter tip for a gas turbine combustor, which has improved material capability to withstand engine operating conditions. The improved materials will reduce the possible failure mechanisms of the igniter tip.

Accordingly, the present invention comprises an igniter assembly for a combustor of a gas turbine, the combustor being of a type including a case and a liner within said case, the assembly comprising an igniter including an elongate body having a first end, a second end, and a mounting feature intermediate said first and second ends, and the mounting feature includes a semi-hemispherical surface and an electrode extending through the body, and a base having an internal cavity with a first internal land, a second internal land opposite the first internal land, first seal means in sealing contact with the first internal land, and biasing means, such as a spring, in contact with the second internal land and said mounting feature. The mounting feature is located within the cavity, the semi-hemispherical surface is proximate the first seal means, and the biasing means urges the semi-hemispherical surface into sealing contact with the first seal means to prevent the leakage of air therethrough.

The foregoing and other features and advantages of the present invention will become more apparent from the following description and accompanying drawings.

DESCRIPTION OF THE PREFERRED EMBODIMENT OF THE PRESENT INVENTION

Figure 1:
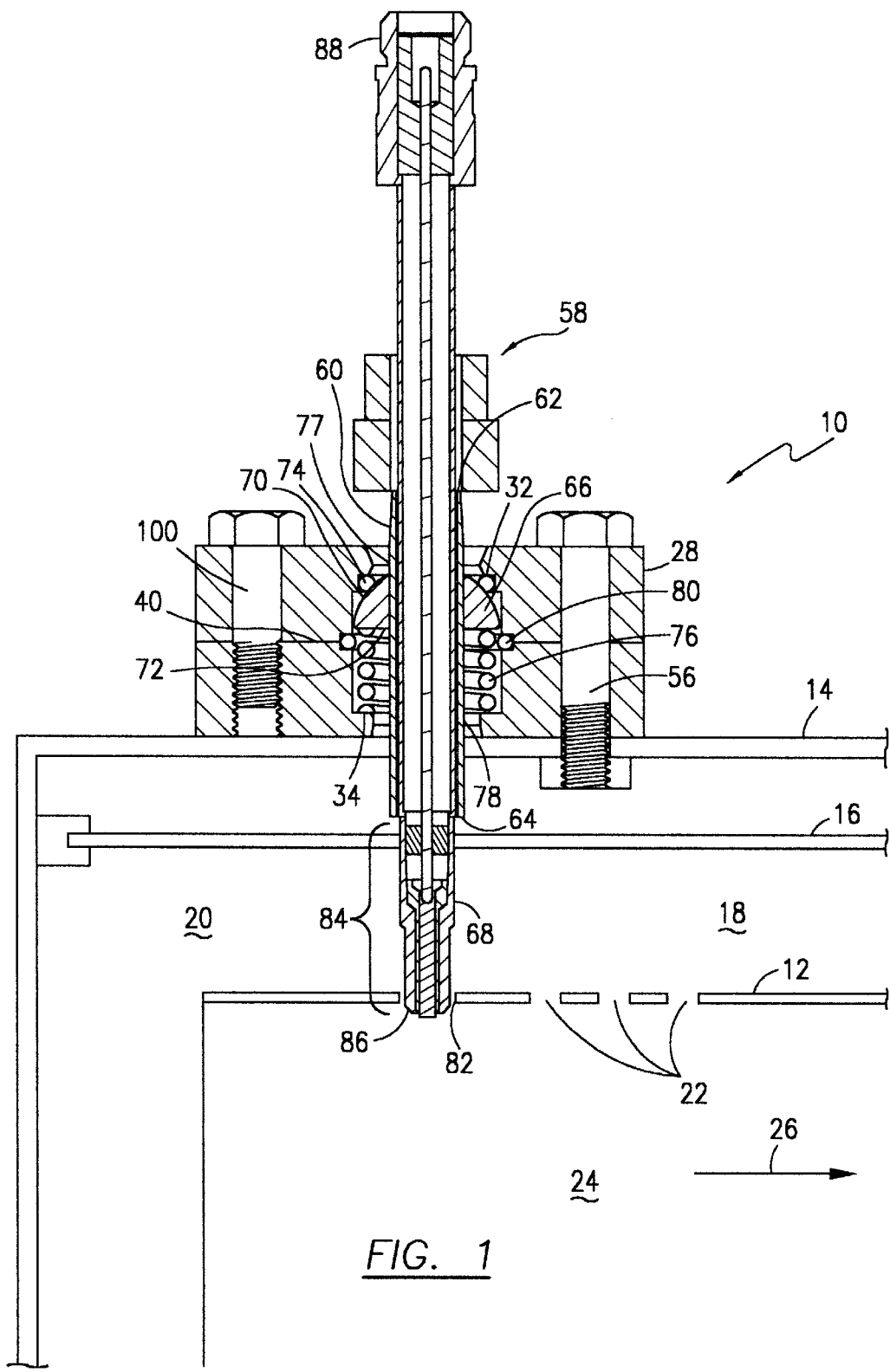
FIG. 1 is partial cross section of a combustor of a gas turbine engine showing an igniter mounting system according to an embodiment of the invention.

As shown in FIG. 1, the igniter assembly 10 is shown in combination with a combustor liner 12 disposed within a combustor case 14. A flow sleeve 16 is mounted within combustor casing 14 and spaced a substantial distance outward from combustor liner 12. The space between flow sleeve 16 and combustor liner 12 forms a portion of a plenum 18 receiving a flow of pressurized air 20 from a compressor (not shown). As is conventional, combustor liner 12 includes a plurality of apertures 22 to permit the pressurized air 20 to flow through the combustor liner 12 to provide combustion, cooling, and dilution air within an interior 24 of combustor liner 12. A conventional fuel nozzle (not shown) injects liquid or gaseous fuel into the interior 24 where it is burned with the air entering through the apertures 22 to form combustion products. The combustion products and any excess fuel or air move in a direction indicated by an arrow 26 toward turbine blades (not shown) to produce the desired work.

Figure 2:
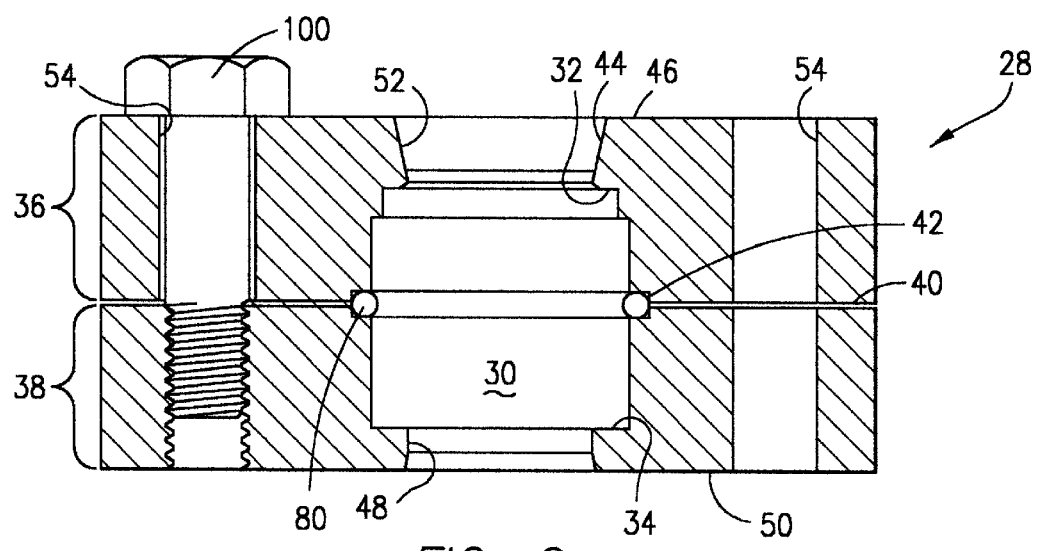
FIG. 2 is cross section of the base of the igniter assembly of the present invention shown without the igniter for the purpose of clarity.

Referring to FIG. 2, the igniter assembly of the present invention includes a base 28 having an internal cavity 30. The internal cavity 30 has a first internal land 32 and a second internal land 34 opposite the first internal land 32. The base 28 is preferably formed from a first portion 36 and a second portion 38 to simplify manufacturing. The first land 32 is on the first portion 36, and said second land 34 is on said second portion 38. The first portion 36 is secured to the second portion 38, preferably by a plurality of bolts 100 (only one of which is shown for clarity, but the others are similar) and the first portion 36 meets the second portion 38 at an interface 40. A circumferentially extending recess 42 extends around the circumference of the cavity 30 at the interface 40. The base 28 has a first bore 44 extending from the internal cavity 30 to a first external surface 46 of the base 28, and a second bore 48 extending from the internal cavity 30 to a to a second external surface 50 of the base 28. The first bore 44 preferably includes a tapered section 52 that tapers towards the first land 32. At least one, and preferably a plurality of mounting bores 54 (only one of which is shown for clarity, but the others are similar) extend through said first portion 36 and said second portion 38 for receiving a fastener 56, such as a bolt, for securing the mounting base 28 to the case 14, as shown in FIG. 1.

Referring again to in FIG. 1, the igniter 58 has an elongate body 60 having a first end 62, a second end 64, and a mounting feature 66 intermediate said first and second ends 62, 64. As used herein, the term "intermediate" means that the mounting feature 66 is located between the first end 62, and the second end 64, but not that the mounting feature 66 is equidistant from the first end 62 and the second and 64. An electrode 68 extends through the elongate body 60. The mounting feature 66 is located within the cavity 30, and preferably comprises a portion of a hemisphere through which the electrode 68 extends. Thus, the mounting feature 66 has a semi-hemispherical surface 70 proximate the first land 32. As used herein, the term "semi-hemispherical surface" means a generally hemispherical surface, but not a surface that defines an entire hemisphere. The mounting feature 66 also includes a substantially planar surface 72 opposite the semi-hemispherical surface 70, and facing the second land 34. A first seal 74, which is preferably an "O-ring" made from a soft metal such as copper, is positioned in sealing contact with the first internal land 32. The semi-hemispherical surface 70 is proximate the first seal 74, and biasing means such as a spring 76 is compressed between the second land 34 and the substantially planar surface 72. As the result of being compressed, the spring 76 urges the semi-hemispherical surface 70 into sealing contact with the first seal 74.

The elongate body 60 that includes a first substantially cylindrical portion 77 that extends through the first bore 44, and a second substantially cylindrical portion 78 that extends through the second bore 48. As used herein, the term "substantially cylindrical" means that the portion is generally cylindrical, but may include a taper. The first bore 44 has a minimum diameter that is at least 10% greater than the diameter of the first substantially cylindrical portion 77 lying radially inward therefrom to allow the igniter 58 to pivot several degrees within the base 28 without causing interference between the first substantially cylindrical portion 77 and the first bore 44. Likewise, the second bore 48 has a minimum diameter that is at least 10% greater than the diameter of the second substantially cylindrical portion 78 lying radially inward therefrom to allow the igniter 58 to pivot several degrees within the base 28 without causing interference between the second substantially cylindrical portion 78 and the second bore 48.

The base 28 has a second seal 80 seated in the recess 42 and extending circumferentially around the cavity 30 at the interface 40 of the first portion 36 and the second portion 38 to prevent the flow of air through the interface 40. The second seal 80, also preferably an "O-ring" made from a soft metal such as copper, is positioned in sealing contact with the first portion 36 and the second portion 38 of the base 28. The liner includes a hole 82, and the electrode 68 includes an ignition section 84 that extends from the second end 64 of the elongate body 60 and terminates in an ignition tip 86. When the base 28 of the igniter assembly 10 of the present invention is mounted on the case 14, the ignition section 84 extends through the case 14, the sleeve 16 and into the hole 82 of the liner 12, thereby positioning the ignition tip 86 within the liner 12. An electrical connector 88 on the electrode 68 permits connection of a source of electricity (not shown) for producing a spark across electrode tip 86.

During installation of igniter assembly 10 into the gas turbine, the elongate body 60 is pivoted with respect to the base 28 as necessary to fit the electrode 68 through the hole 82 in combustor liner 12. This provides accommodation for a substantial amount of positioning errors resulting from manufacturing tolerances. Also, during operation of the gas turbine engine, if differential thermal expansion causes a change in the relative positions of the base 28 and hole 82, a force is applied to electrode tip 86 by the liner 12 at the hole 82, causing the elongate body 60 to pivot within base 28 as necessary to limit stresses applied to the elongate body 60, even when the ignition section 84 of the electrode 68 is snugly positioned in the hole 82 of the liner 12.

The semi-hemispherical surface 70 provides pivot/rotation capability and is spring loaded to maintain an air seal when not in use. Bypass compressor discharge air 20 enters into the igniter base 28 under engine operation conditions and provides a natural sealing mechanism against the seal 74. The spring 76 allows limited mobility of the semi-hemispherical surface 70 and igniter tip 86 to tolerate relative movement of the case 14 and the liner 12.

Although the invention has been shown and described with respect to a preferred embodiment thereof it should be understood by those skilled in the art that other various changes and omissions in the form and detail of the invention may be made without departing from the spirit and scope thereof.

We claim:

1. An igniter assembly for a combustor of a gas turbine, said combustor being of a type including a case and a liner within said case, said assembly comprising:
    an igniter including an elongate body having a first end, a second end, and a mounting feature intermediate said first and second ends, said mounting feature including a semi-hemispherical surface, and an electrode extending through said body; and,
    a base including an internal cavity having a first internal land, a second internal land opposite said first internal land, first seal means in sealing contact with said first internal land, and biasing means in contact with said second internal land and said mounting feature;
    wherein said mounting feature is located within said cavity, said semi-hemispherical surface is proximate said first seal means, and said biasing means urges said semi-hemispherical surface into sealing contact with said first seal means.

2. The igniter assembly of claim 1 wherein said biasing means is a spring, and said spring is compressed between said mounting feature and said second land.

3. The igniter assembly of claim 2 wherein said base further comprises a first bore extending from said internal cavity to a first external surface of said base, a second bore extending from said internal cavity to a to a second external surface of said base, said elongate body includes first substantially cylindrical portion that extends through said first bore and a second substantially cylindrical portion that extends through said second bore, and each of said bores has a minimum diameter that is at least 10% greater than the substantially cylindrical portion that extends therethrough.

4. The igniter assembly of claim 3, wherein said base further comprises a first portion and a second portion, said first land is on said first portion and said second land is on said second portion, and said first portion is secured to said second portion.

5. The igniter assembly of claim 4, wherein said base further comprises a second seal means extending circumferentially around the cavity at an interface of the first portion and the second portion to prevent the flow of air through said interface.

6. The igniter assembly of claim 5, wherein said mounting feature includes a substantially planar surface facing said second land, and said spring is compressed between said second land and said substantially planar surface.

7. The igniter assembly of claim 6, wherein said first bore includes a tapered section that tapers towards said first land.

8. The igniter assembly of claim 7, wherein said liner includes a hole, said electrode includes an ignition section that extends from said second end of said elongate body and terminates in an ignition tip, and said base includes at least one mounting bore for receiving a fastener for securing said mounting base to said case such that said ignition section extends through said case and said hole, thereby positioning said tip within said liner.

9. The igniter assembly of claim 5 wherein said seal means is a ring made of copper.

10. The igniter assembly of claim 1 wherein said seal means is a ring made of copper.

* * * * *